United States Patent
Hayman et al.

(10) Patent No.: US 12,055,032 B2
(45) Date of Patent: Aug. 6, 2024

(54) FLEXURAL WAVE MEASUREMENT FOR THICK CASINGS

(71) Applicant: Schlumberger Technology Corporation, Sugar Land, TX (US)

(72) Inventors: Andrew Hayman, Voisins-le-bretonneux (FR); Christoph Klieber, Paris (FR); Jean-Luc Le Calvez, Clamart (FR); Thilo Brill, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/046,516

(22) Filed: Oct. 14, 2022

(65) Prior Publication Data
US 2023/0136442 A1    May 4, 2023

Related U.S. Application Data
(63) Continuation of application No. 15/973,839, filed on May 8, 2018, now Pat. No. 11,473,419.

(30) Foreign Application Priority Data
May 15, 2017 (EP) .................................. 17290062

(51) Int. Cl.
*G01V 1/40* (2006.01)
*E21B 47/005* (2012.01)
(Continued)

(52) U.S. Cl.
CPC .......... *E21B 47/005* (2020.05); *E21B 47/107* (2020.05); *G01N 29/041* (2013.01);
(Continued)

(58) Field of Classification Search
None
See application file for complete search history.

(56) References Cited

U.S. PATENT DOCUMENTS

| 6,483,777 B1 | 11/2002 | Zeroug |
| 7,522,471 B2 | 4/2009 | Froelich et al. |
| (Continued) | | |

FOREIGN PATENT DOCUMENTS

| EP | 3151038 A1 | 4/2017 |
| JP | 2006300854 A | 11/2006 |

OTHER PUBLICATIONS

S. Zeroug, B. Froelich, "Ultrasonic Leaky-Lamb Wave Imaging Through a Highly Contrasting Layer", IEEE UFFC 2003. 5 pages.
(Continued)

*Primary Examiner* — Hovhannes Baghdasaryan
(74) *Attorney, Agent, or Firm* — Jeffrey D. Frantz

(57) ABSTRACT

Systems and methods are provided for obtaining a flexural-attenuation measurement for cement evaluation that may be effective even for wells with relatively thick casings. A method includes emitting an acoustic signal at a casing in a well that excites the casing into generating an acoustic response signal containing acoustic waves, such as Lamb waves. The Lamb waves include flexural waves and extensional waves. The casing may be relatively large, having a thickness of at least 16 mm. The acoustic response signal may be detected and filtered to reduce a relative contribution of the extensional waves. This may correspondingly increase a relative contribution of the flexural waves. The filtered acoustic response signal may be used as a flexural-attenuation measurement for cement evaluation.

20 Claims, 4 Drawing Sheets

(51) Int. Cl.
*E21B 47/107* (2012.01)
*G01N 29/04* (2006.01)
*G01N 29/11* (2006.01)
*G01N 29/42* (2006.01)

(52) U.S. Cl.
CPC ............ *G01N 29/11* (2013.01); *G01N 29/42* (2013.01); *G01V 1/40* (2013.01); *G01N 2291/0232* (2013.01); *G01N 2291/0427* (2013.01); *G01N 2291/2636* (2013.01)

(56) References Cited

U.S. PATENT DOCUMENTS 11,473,419 B2  10/2022  Hayman et al.
2016/0209539 A1  7/2016  Le Calvez

OTHER PUBLICATIONS

E Calvez Jean-Luc et al., "A method to separate flexural and extensional signals from mixed-mode ultrasonic signals", 2016 IEEE international ultrasonics symposium, IEEE, Sep. 18, 2016, pp. 1-4.
Wang, Understanding acoustic methods for cement bond logging, The Journal of the Acoustical Society of America 139, 2407, 2016.
Extended European Search Report issued in EP Application 17290062.3, dated Nov. 16, 2017, 12 pages.

FLEXURAL WAVE MEASUREMENT FOR THICK CASINGS

CROSS-REFERENCE TO RELATED APPLICATIONS

This application is a continuation of co-pending U.S. patent application Ser. No. 15/973,839 filed May 8, 2018, which claims priority to European Patent Application No. 17290062.3 filed May 15, 2017, which are herein incorporated by reference.

BACKGROUND

This disclosure relates to processing for flexural wave measurements obtained by an acoustic downhole tool, which may allow flexural measurements to be used even in cased wells with relatively thicker casings.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as an admission of any kind.

A wellbore drilled into a geological formation may be targeted to produce oil and/or gas from certain zones of the geological formation. To prevent zones from interacting with one another via the wellbore and to prevent fluids from undesired zones entering the wellbore, the wellbore may be completed by placing a cylindrical casing into the wellbore and cementing the annulus between the casing and the wall of the wellbore. During cementing, cement may be injected into the annulus formed between the cylindrical casing and the geological formation. When the cement properly sets, fluids from one zone of the geological formation may not be able to pass through the wellbore to interact with one another. This desirable condition is referred to as "zonal isolation." Yet well completions may not go as planned. For example, the cement may not set as planned and/or the quality of the cement may be less than expected. In other cases, the cement may unexpectedly fail to set above a certain depth due to natural fissures in the formation.

A variety of acoustic tools may be used to verify that cement is properly installed. These acoustic tools may use pulsed acoustic waves as they are lowered through the wellbore to obtain acoustic cement evaluation measurements. Flexural attenuation is one such cement evaluation measurement, since flexural attenuation is a function of acoustic impedance on both sides of the casing, and therefore depends on the material properties of cement on the other side of the casing. In addition, flexural attenuation has a long history of use in determining whether cement behind a casing in a well has been properly installed. To obtain a flexural attenuation measurement, an ultrasonic acoustic downhole tool may emit pulses in the range of a few hundreds of kilohertz. The cement sheath behind the casing is evaluated by sending a short pressure pulse toward the casing wall that excites elastic waves inside the casing. The propagation of these waves is strongly affected by the casing-cement bond quality and the cement properties. An acoustic beam at oblique incidence onto the casing excites modes of the family of Lamb waves, which are predominantly the zeroth-order antisymmetric (flexural) and symmetric (extensional) modes. Based on the flexural mode response, such as the flexural attenuation, the quality of the cement installation may be estimated and output onto a well log.

While the flexural attenuation measurement has a long history of being used accurately and effectively to identify the quality of cement installed in a well, this measurement may not conform to expected models under certain conditions. In particular, flexural attenuation measurements, as may be obtained by downhole acoustic tools and processed under conventional methods, may not conform as expected to well-established cement evaluation models at relatively thicker well casings. Since wells are increasingly being completed using thicker casings, many conventionally obtained and processed flexural attenuation measurements may not accurately predict the quality of cement installed in these wells.

SUMMARY

A summary of certain embodiments disclosed herein is set forth below. These aspects are presented merely to provide the reader with a summary of these certain embodiments and that these aspects are not intended to limit the scope of this disclosure. Indeed, this disclosure may encompass a variety of aspects that may not be set forth below.

It is believed that, at least for larger casings with thickness of about 16 mm or greater, the extensional mode of certain acoustic waves, such as Lamb waves—as opposed to the flexural mode of the acoustic waves—may form an increasingly larger proportion of the acoustic energy of the acoustic waves that return to the downhole tool. The systems and methods of this disclosure may counteract the detrimental effect of these extensional waves by reducing the contribution of the extensional waves to the measured overall acoustic signal. This may be done by adjusting the acoustic pulse to have a lower center frequency and/or by filtering the acoustic signals that return to the downhole acoustic tool. In one example, since the extensional mode waves tend to have more energy at higher frequencies than the flexural mode waves, an initial acoustic pulse having a lower center frequency than may be generally used with thinner casings be used. For instance, a pulse having a center frequency of less than about 3.2 MHzmm in relation to a casing of about 16 mm or greater (e.g., less than around 200 kHz, or around 125 kHz in certain cases) may be used to excite the casing to produce acoustic waves, such as Lamb waves. Additionally or alternatively, the acoustic waves that return may be filtered using a filter that excludes at least some of the extensional waves. In one example, a low pass filter of the center frequency (e.g., less than about 3.2 MHzmm in relation to a casing of about 16 mm or greater, less than about 200 kHz, or around 125 kHz in certain cases) may be used. The acoustic pulse frequency, filter frequency, and/or filter parameters may vary depending on the expected or known conditions of the well, such as borehole fluid velocity. This may filter out the extensional waves that are produced, which may form an increasingly large proportion of the acoustic response signal for thicker casings. Thus, even for thicker casings, the flexural mode signal may be used to accurately and effectively estimate cement parameters.

In one example, a method may include emitting an acoustic signal at a casing in a well. The acoustic signal may excite the casing into generating an acoustic response signal containing acoustic waves, such as Lamb waves. The acoustic waves include flexural waves and extensional waves. The acoustic response signal from the casing in the well may be detected and filtered. Filtering the detected acoustic response signal may reduce a relative contribution of the extensional waves and thereby increase a relative contribution of the flexural waves. The filtered acoustic response signal may be used as a flexural-attenuation measurement, even in wells with relatively larger casings (e.g., casings thicker than 16 mm).

In another example, a system may include an acoustic downhole tool and a data processing system. The acoustic downhole tool may be able to be positioned in a cased well and obtain an acoustic measurement of acoustic waves, such as Lamb waves, produced by the casing when excited by an acoustic pulse of less than 200 kHz. The data processing system may filter the acoustic measurement to reduce non-flexural-mode components of the acoustic measurement.

In another example, an article of manufacture that includes a tangible, nontransitory, machine-readable media may have instructions to receive and filter an acoustic measurement. The acoustic measurement may have been obtained by a downhole acoustic tool, and may include acoustic waves, such as Lamb waves, produced by an acoustically excited casing having a thickness of 16 mm or greater. The acoustic measurement may be filtered using a filter that at least partially remove frequencies of 200 kHz or greater.

Various refinements of the features noted above may be undertaken in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
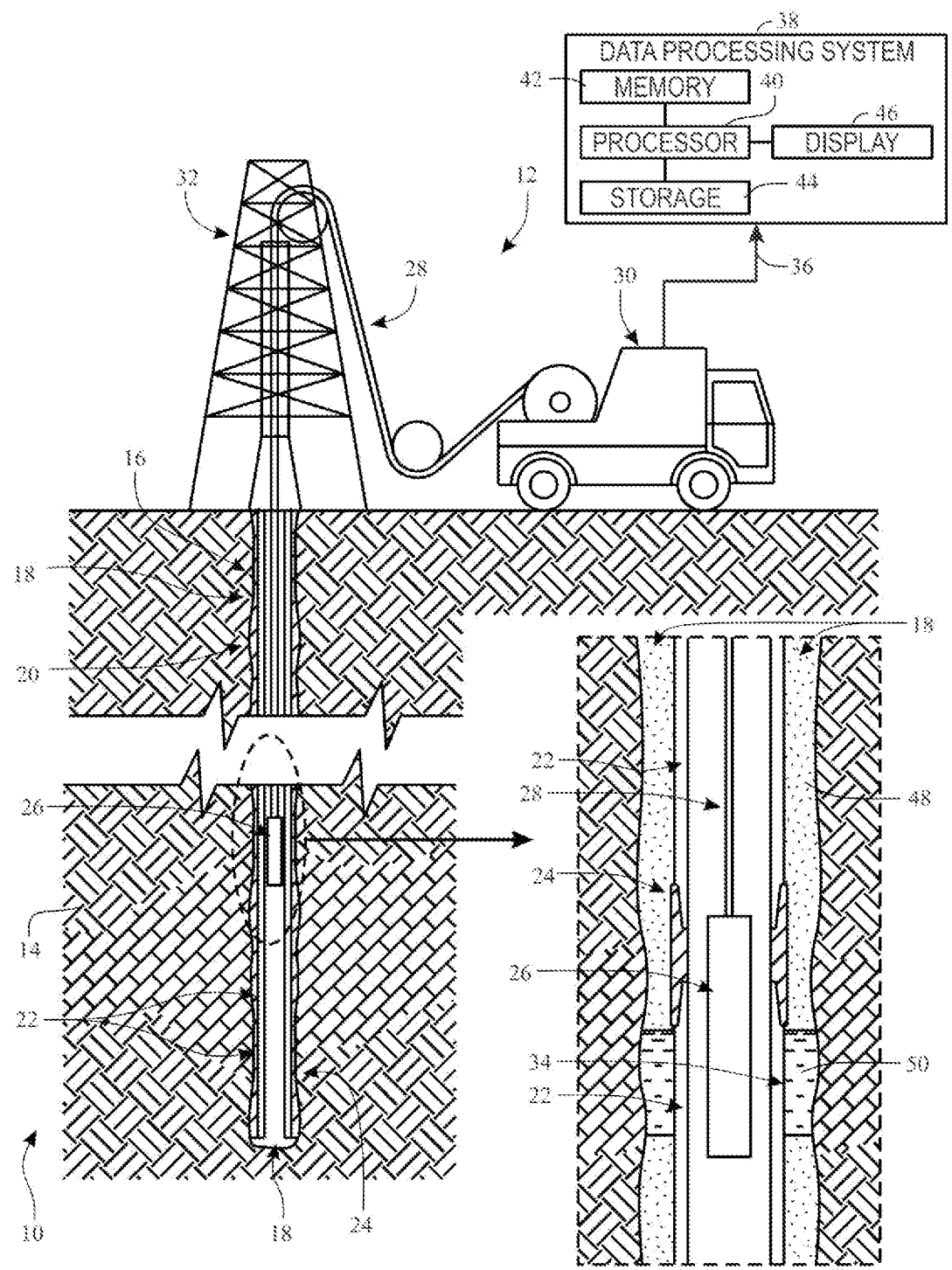
FIG. 1 is a schematic diagram of a system for verifying proper cement installation and/or zonal isolation of a well, in accordance with an embodiment.

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, references to "one embodiment" or "an embodiment" of the present disclosure are not intended to be interpreted as excluding the existence of additional embodiments that also incorporate the recited features.

When a well is drilled, metal casing may be installed inside the well and cement placed into the annulus between the casing and the wellbore. When the cement sets, fluids from one zone of the geological formation may not be able to pass through the annulus of the wellbore to interact with another zone. This desirable condition is referred to as "zonal isolation." Proper cement installation may also ensure that the well produces from targeted zones of interest. To verify that the cement has been properly installed, an acoustic downhole tool may use pulsed acoustic waves to obtain acoustic cement evaluation measurements. This disclosure focuses on the flexural attenuation cement evaluation measurement, has a long history of use in determining whether cement behind a casing in a well has been properly installed. To obtain a flexural attenuation measurement, an ultrasonic acoustic downhole tool may emit pulses in the range of a few hundred kilohertz. The cement sheath behind the casing is evaluated by sending a short pressure pulse toward the casing wall that excites elastic waves inside the casing. The propagation of these waves is strongly affected by the casing-cement bond quality and the cement properties. An acoustic beam at oblique incidence onto the casing excites modes of the family of Lamb waves, which are predominantly the zeroth-order antisymmetric (flexural) and symmetric (extensional) modes. Based on the flexural mode response, the quality of the cement installation may be estimated and output onto a well log.

As noted above, the flexural attenuation measurement has a long history of being used accurately and effectively to identify the quality of cement installed in a well. As such, the models that have been developed to estimate cement quality based on the flexural attenuation measurement remain particularly valuable. Yet the models may not accurately identify the quality of the cement if the actual flexural attenuation measurement obtained by the acoustic downhole tool does not behave as expected. And as increasingly larger casings are being used to complete wells, the flexural attenuation measurement appears to increasingly exhibit an unexpected behavior with increased casing thickness. Indeed, for larger casings, the flexural attenuation measurements may diverge from the expected modeled behavior.

The flexural attenuation measurements are generally obtained by measuring the Lamb waves that return following an acoustic pulse at oblique incidence onto the casing. The angle of incidence of the acoustic signal against the casing may be adapted to the logging fluid velocity to optimize coupling to the flexural mode at the fluid-casing interface, as opposed to other modes of the Lamb waves, such as the Lamb waves of the extensional mode. Since obtaining the flexural attenuation measurements has involved measuring the Lamb waves that return to the downhole tool in response, measuring flexural waves has also involved measuring at least some extensional waves.

It is believed that, for larger casings of about 16 mm or greater, the extensional mode of Lamb waves—as opposed to the flexural mode of the Lamb waves—may form an increasingly larger proportion of the acoustic energy of the Lamb waves that return to the downhole tool. In other words, it is believed that as casings increase in thickness, the Lamb waves that are excited on the casing and return to the downhole acoustic tool contain more extensional wave signal and less flexural wave signal. As mentioned above, however, the flexural attenuation measurement models that are used to estimate cement quality depend on flexural wave measurements, not extensional wave measurements. Thus, the increasing proportion of extensional waves in relation to flexural waves among the measured Lamb waves is believed to result in less accurate flexural attenuation measurements for larger casings.

It has been discovered that the detrimental effect of the extensional waves may be counteracted by carefully filtering the acoustic signals that return to the downhole acoustic tool. Any suitable filter that filters the extensional mode waves from the flexural mode waves may be used. In one example, since the extensional mode waves tend to have higher frequencies than the flexural mode waves, an initial acoustic pulse having a lower center frequency than may be generally used with thinner casings be used. For example, a pulse having a center frequency of 125 kHz may be used to excite the casing to produce Lamb waves. Additionally or alternatively, the Lamb waves that return may be filtered using a filter that excludes at least some of the extensional waves. In one example, a low pass filter of the center frequency (e.g., 125 kHz in certain cases) may be used. The filter parameters may vary depending on the expected or known conditions of the well, such as borehole fluid velocity. This may filter out the extensional waves that are produced, which may form an increasingly large proportion of the acoustic response signal for thicker casings. In some cases, a higher center frequency may be used (e.g., 250 kHz) under conditions where the casing is thin (e.g., less than about 16 mm) or where the mud is not highly attenuative (e.g., is less than or equal to about 16 dB/cm/MHz), while a lower center frequency may be used (e.g., 125 kHz) may be used under conditions where both the casing is thick (e.g., greater than about 16 mm) and the mud is highly attenuative (e.g., is greater than about 16 dB/cm/MHz). Based on the techniques of this disclosure, even for thicker casings, the flexural mode signal may be used to accurately and effectively estimate cement parameters that might otherwise be indiscernible—in other words, the systems and methods of this disclosure provide unconventional techniques to solve a technical problem in industry.

With this in mind, FIG. 1 illustrates a system 10 for evaluating cement behind casing in a well. In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations.

As seen in FIG. 1, several casing joints 22 (also referred to below as casing 22) are coupled together by the casing collars 24 to stabilize the wellbore 16. The casing joints 22 represent lengths of pipe, which may be formed from steel or similar materials. In one example, the casing joints 22 each may be approximately 13 m or 40 ft long, and may include an externally threaded (male thread form) connection at each end. A corresponding internally threaded (female thread form) connection in the casing collars 24 may connect two nearby casing joints 22. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically aggressive fluid.

The surface equipment 12 may carry out various well logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation data (e.g., flexural attenuation and/or acoustic impedance) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. The acoustic logging tool 26 may be, for example, an UltraSonic Imager (USI) tool and/or an Isolation Scanner (IS) tool by Schlumberger Technology Corporation. The acoustic logging tool 26 may obtain measurements of acoustic impedance from ultrasonic waves and/or flexural attenuation. For instance, the acoustic logging tool 26 may obtain a measurement of the flexural mode. These measurements may be used as acoustic cement evaluation data using any suitable flexural attenuation measurement models, which may be based on the wealth of historical flexural attenuation measurements and/or computer model data. For example, the flexural attenuation measurements may be used in a solid-liquid-gas (SLG) model map to identify likely locations where solid, liquid, or gas is located in the annulus 20 behind the casing 22, and/or may be used to generate a well log indicating where the cement in the annulus 20 behind the casing 22 has or has not set.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. As will be discussed further below, the vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic cement evaluation data relating to the presence of solids, liquids, or gases behind the casing 22. For instance, the acoustic logging tool 26 may obtain measures of flexural attenuation, which may be used to determine where the material behind the casing 22 is a solid (e.g., properly set cement) or is not solid (e.g., is a liquid or a gas). When the acoustic logging tool 26 provides such measurements to the surface equipment 12 (e.g., through the cable 28), the surface equipment 12 may pass the measurements as acoustic cement evaluation data 36 to a data processing system 38 that includes a processor 40, memory 42, storage 44, and/or a display 46. In other examples, the acoustic cement evaluation data 36 may be processed by a similar data processing system 38 at any other suitable location. The data processing system 38 may collect the acoustic cement evaluation data 36 and determine whether such data 36 represents a solid, liquid, or gas using a solid-liquid-gas (SLG) model map or any other suitable models that are based at least in part on flexural attenuation measurements. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In this way, the acoustic cement evaluation data 36 from the acoustic logging tool 26 may be used to determine whether cement of the annular fill 18 has been installed as expected. In some cases, the acoustic cement evaluation data 36 may indicate that the cement of the annular fill 18 has a generally solid character (e.g., as indicated at numeral 48) and therefore has properly set. In other cases, the acoustic cement evaluation data 36 may indicate the potential absence of cement or that the annular fill 18 has a generally liquid or gas character (e.g., as indicated at numeral 50), which may imply that the cement of the annular fill 18 has not properly set. For example, when the indicate the annular fill 18 has the generally liquid character as indicated at numeral 50, this may imply that the cement is either absent or was of the wrong type or consistency, and/or that fluid channels have formed in the cement of the annular fill 18. By processing the acoustic cement evaluation data 36—for example, by filtering away extensional wave measurements to achieve purer flexural wave measurements—the character of the annular fill 18 may be more accurate and/or precise because the flexural attenuation measurements obtained in this way may better conform to established cement evaluation models. Indeed, any suitable cement evaluation models that consider the flexural attenuation measurement may be used.

Figure 2:
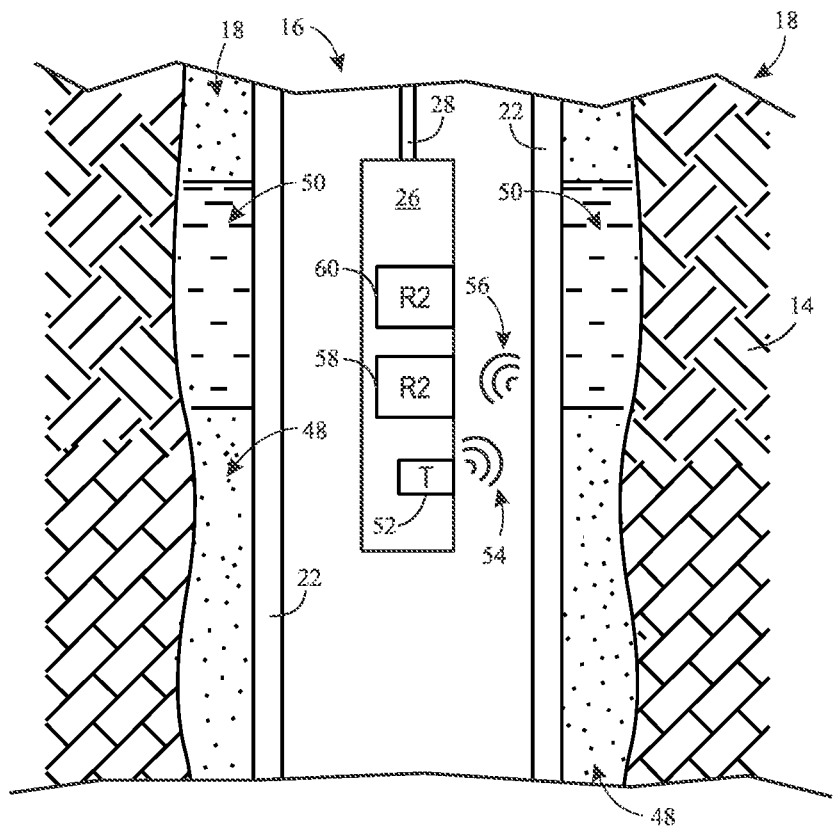
FIG. 2 is a block diagram of an acoustic downhole tool to obtain acoustic cement evaluation data relating to material behind casing of the well, in accordance with an embodiment.

FIG. 2 provides a general example of the operation of the acoustic logging tool 26 in the wellbore 16. Specifically, an acoustic transmitter 52 in the acoustic logging tool 26 may emit an acoustic signal 54 at oblique incidence onto the casing 22. This excites modes of the family of Lamb waves 56 in response, which are predominantly the zeroth-order antisymmetric (flexural) and symmetric (extensional) modes. The angle of incidence of the acoustic signal 54 may be adapted to the logging fluid velocity to optimize coupling to the flexural mode at the fluid-casing interface to produce the Lamb waves 56. The Lamb waves 56 may be detected by a pair of receiver transducers (e.g., a first receiver transducer 58 and a second receiver transducer 60) that are disposed at different respective distances from the transmitter 52.

In general, Lamb waves exhibit dispersion, which means that the propagation velocity depends on the frequency. Therefore, the envelope of a short-pulsed, and therefore broadband, acoustic Lamb wave pulse propagates with a certain group velocity. The temporal width of the envelope, however, increases with time as different frequency constituents of the wave packet move at different speeds. One specific characteristic of the antisymmetric flexural mode of the Lamb waves may be particularly valuable: namely, that the group velocity of the antisymmetric flexural mode is only weakly frequency-dependent for a large range of casing thicknesses. Thus, the attenuation of the flexural mode of the Lamb waves 56, as measured by the receiver transducers 58 and/or 60, thus provides reliable information on the cement, in particular for light cement. The second Lamb wave type, the extensional mode with symmetric particle displacement, is generally also excited alongside the flexural mode in the Lamb waves 56. But for flexural attenuation cement log interpretations, which are based on the flexural attenuation measurement, the presence of the extensional mode is undesired. In logging thin to medium-thickness casings (e.g., a wall thickness of less than about 16 mm), the flexural wave excitation can be selectively favored over the extensional excitation by a judicious choice of transducer angles.

Thus, when logging thicker casings (e.g., above a wall thickness of 16 mm, which is increasingly being used in completing wells), the interpretation may be less robust. And in many situations where the fluid within the casing has a high attenuation (e.g., greater than 16 dB/cm/MHz), pulse frequencies according to the same frequency-thickness product used for thinner casings may prove unacceptable. The systems and methods of this disclosure may overcome some of the challenges of logging thicker casings.

Figure 3:
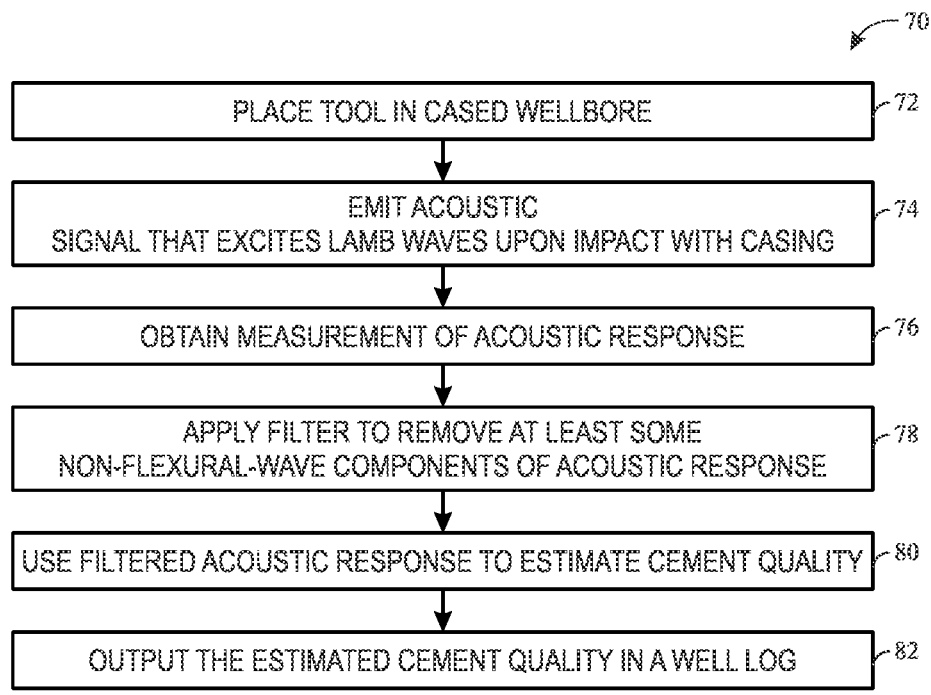
FIG. 3 is a flowchart of a method for obtaining and processing a flexural attenuation measurement that may conform to cement evaluation models even for relatively thicker well casings, in accordance with an embodiment.

Indeed, to obtain an improved flexural attenuation measurement, even when logging thicker casings (e.g., above a wall thickness of 16 mm), the impact of extensional wave modes may be reduced by emitting the acoustic signal 54 at a lower center frequency than used for thinner casings. In some cases, where the frequency-thickness product used for thinner casings is about 3.2 MHz·mm (e.g., about 200 kHz for an 16 mm casing or about 400 kHz 8 mm casing), a lower frequency-thickness product (e.g., less than about 3.2 MHz·mm for a 16 mm casing, such as about 2.5 MHz·mm) may be used for thicker casings. This may amount to less than about 200 kHz, between about 100 to 150 kHz, or about 125 kHz in some situations. The pulse center frequency may be used in a filter that excludes some of the extensional modes from the measurement of the Lamb waves 56. For example, as shown by a flowchart 70 of FIG. 3, the acoustic logging tool 26 may be placed into the cased wellbore 16 (block 72). The acoustic logging tool 26 may emit an acoustic signal 54 that excites Lamb waves 56 due to an interaction of the acoustic signal with the casing 22 (block 74). The acoustic logging tool 26 may emit any suitable acoustic signal 54 of any suitable frequency. In certain examples, for relatively thinner casings, the frequency may be higher (e.g., about 250 kHz), and for relatively thicker casings, the frequency may be lower (e.g., less than about 200 kHz, such as about 125 kHz). In general, however, the acoustic logging tool 26 may emit a pulse having any suitable frequency lower than 500 kHz (e.g., 125 kHz, 150 kHz, 175 kHz, 200 kHz, 225 kHz, 250 kHz, 275 kHz, 300 kHz, 325 kHz, 350 kHz, 375 kHz, 400 kHz, 425 kHz, 450 kHz, 475 kHz, 500 kHz, or the like), but other frequencies higher than 500 kHz or lower than 100 kHz may also be used, provided that acoustic signals of those frequencies excite Lamb waves in the casing 22.

The acoustic logging tool 26 may obtain measurements of the Lamb waves 56 that result as an acoustic response to the originally emitted acoustic signal 54 (block 76). Any suitable filter that excludes at least some non-flexural-wave components may be applied to the measurement of the Lamb waves 56 (block 78). The resulting filtered acoustic response signal may contain a greater proportion of energy due to flexural attenuation and a lower proportion of energy due to other acoustic components, such as extensional waves. This resulting filtered acoustic response signal may be used to estimate cement quality using any suitable models that are based at least in part on flexural attenuation (block 80). Because the filtered acoustic response signal is due more to the desirable flexural waves and less to other less-desirable modes (e.g., extensional waves) than the unfiltered acoustic response signal, the filtered acoustic response signal may provide a more accurate estimate of the cement quality than the unfiltered acoustic response signal, even if the filter does not fully remove the non-flexural-wave components from the unfiltered acoustic response signal. The resulting estimate of cement quality may be output in a well log or used in any other suitable cement evaluation visualization or presentation (block 82).

Any suitable form(s) of filtering may be applied at block 78 of the flowchart 70. In one example, the acoustic response signal obtained by the acoustic logging tool 26 may be digitized and provided as acoustic cement evaluation data 36 to the data processing system 38. The data processing system 38 may process the acoustic response signal, including by applying a filter that filters out non-flexural-mode waves from the acoustic response signal. One example of such a filter may be a low pass filter (or any other suitable filter, such as a band pass filter or band gap filter) that may exclude at least some frequencies that tend to include more extensional components and fewer flexural components. For example, it has been identified that an acoustic signal 54 having a center frequency of about 125 kHz may produce better results for relatively thicker casings (e.g., of 16 mm thickness or greater) than the 250 kHz signal that may produce better results for a thinner casing (e.g., of less than 16 mm thickness), particularly when the attenuation of the fluid in the casing is relatively high (e.g., greater than 16 dB/cm/MHz).

Moreover, the parameters of the filter may vary based at least partly on the conditions of the wellbore 16. For example, a filter length parameter may be selected at least in part on different mud attenuations. When the mud attenuation is higher, the filter aggressiveness (e.g., length) may be lower, and when the mud attenuation is lower, the filter aggressiveness may be higher. In one example, the filter length may have more nonzero coefficients (e.g., 20 or more coefficients, between 20 and 30 coefficients, or about 25 coefficients) for lower-attenuation fluids (e.g., fluids of less than about 16 dB/cm/MHz), and the filter may have fewer nonzero coefficients (e.g., 20 or fewer coefficients, between 10 and 20 coefficients, or about 15 coefficients) for higher-attenuation fluids (e.g., fluids of 16 dB/cm/MHz or more). Any other suitable filter parameters may vary depending on the casing thickness and/or attenuation of casing fluid to provide more aggressive filtering when the mud attenuation is lower and less aggressive when the mud attenuation is higher. Filter parameters that may be adjusted may include, among other things, the way the coefficients are applied in the filter, which may vary, for example, depending on the mud attenuation.

Additionally or alternatively, the acoustic response signal may be filtered using analog circuitry or even mechanically through the design of the receiver transducers 58 or 60. For instance, the electrical signals from the receiver transducers 58 and 60 may be filtered through analog electrical circuitry that filters out extensional waves in favor of flexural waves (e.g., via an analog low pass filter). Additionally or alternatively, the receiver transducers 58 and 60 may be designed so as to mechanically filter out extensional waves in favor of flexural waves.

Figure 4:
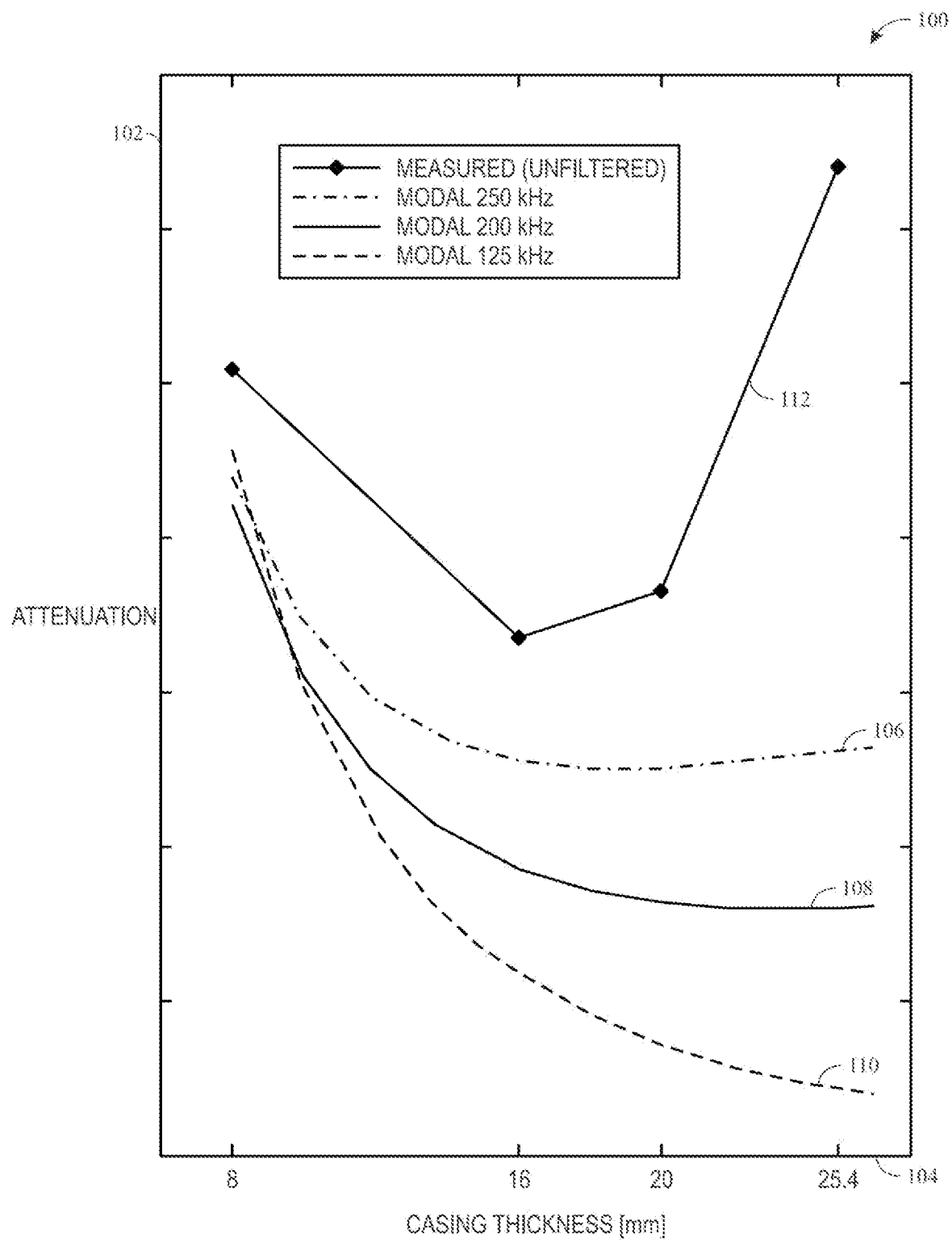
FIG. 4 is a plot comparing measured to modeled flexural attenuation measurements without low-pass-filtering the measured flexural attenuation measurements, in accordance with an embodiment.
Figure 5:
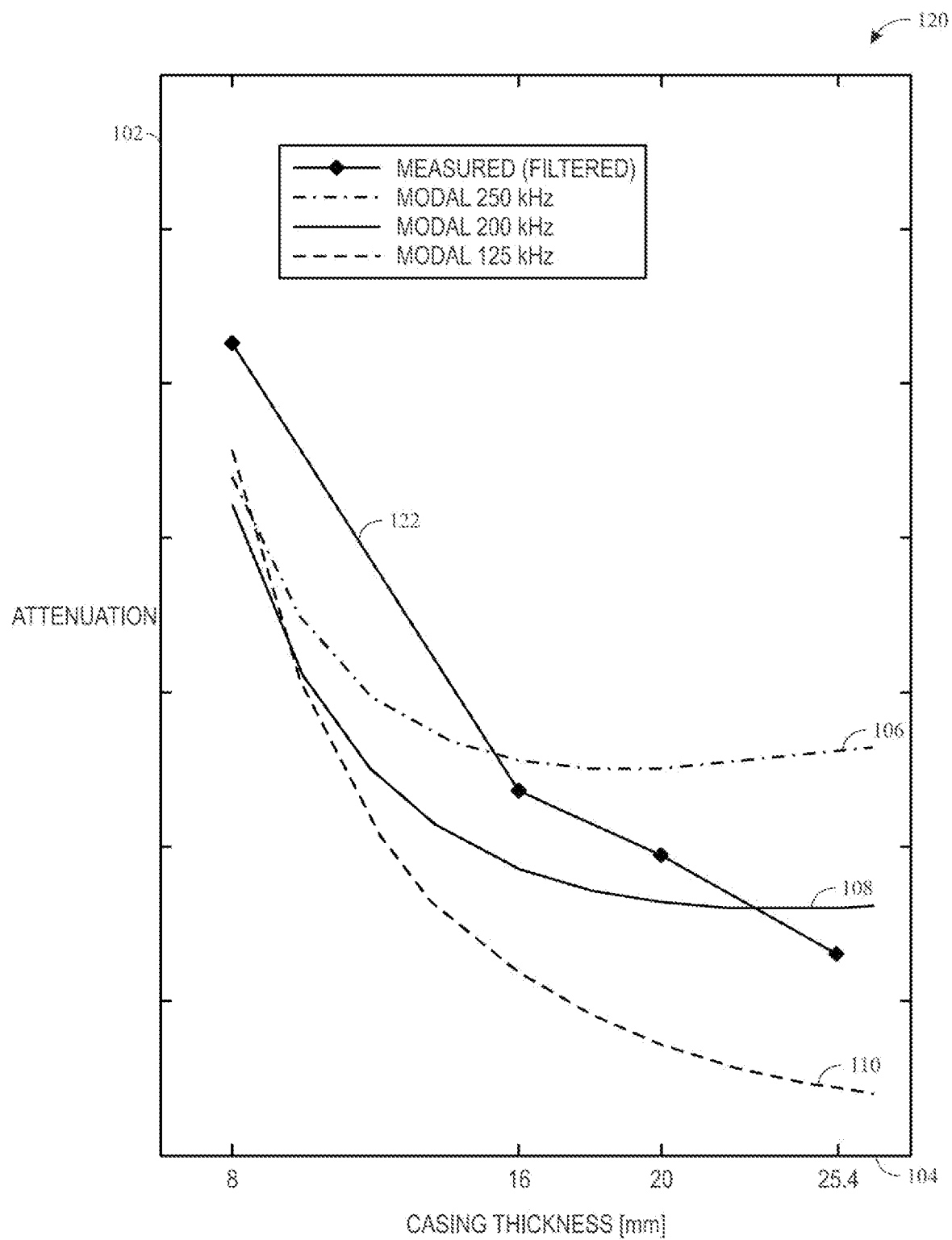
FIG. 5 is a plot comparing measured to modeled flexural attenuation measurements when the measured flexural attenuation measurements are low-pass filtered, thereby causing the measured flexural attenuation measurements to better conform to the modeled flexural attenuation measurements, in accordance with an embodiment.

FIGS. 4 and 5 illustrate the effect of filtering out non-flexural-mode waves from the acoustic response signal detected by an acoustic logging tool 26. In FIG. 4, a plot 100 relates flexural attenuation in units of dB/m (ordinate 102) to casing thickness in units of mm (abscissa 104) in a zero-attenuation fluid. Modal model curves 106, 108, and 110 represent 1D models for values of flexural attenuation that depend on frequency. In this example, the modal model curve 106 represents a modal model of flexural attenuation for 250 kHz frequency, the modal model curve 108 represents a modal model of flexural attenuation for 200 kHz frequency, and the modal model curve 110 represents a modal model of flexural attenuation for 125 kHz frequency (for comparison). A measured flexural attenuation curve 112 represents reprocessed lab data acquired using a 250 kHz firing pulse with zero mud attenuation. While there is an offset at the 8 mm casing thickness, this may be removed by calibration. As can be seen, however, the measured flexural attenuation curve 112 does not follow the same general trajectory as the modal model curves 106, 108, or 110. Indeed, beyond 16 mm of thickness, the measured flexural attenuation curve 112 begins to trend upward, increasing as the casing thickness increases. The divergence between the measured flexural attenuation curve 112 and the modal model curves 106, 108, and 110 is believed to be due to extensional wave contamination. Note that the 250 kHz model (curve 106) is in better agreement with the measured flexural attenuation curve 112. It is believed that the spectra contain significant energy above 250 kHz.

While the plot 100 of FIG. 4 illustrates the effect of using measured flexural attenuation data that is not filtered, a plot 120 shown in FIG. 5 illustrates the effect of using measured flexural attenuation data that has been filtered and that is based on an acoustic pulse with center frequency of about 125 kHz. In FIG. 5, the plot 120 relates flexural attenuation in units of dB/m (ordinate 102) to casing thickness in units of mm (abscissa 104) in a zero-attenuation fluid. The modal model curves 106, 108, and 110 are reproduced in FIG. 5, representing 1D models for values of flexural attenuation that depend on frequency. Thus, the modal model curve 106 represents a modal model of flexural attenuation for 250 kHz frequency, the modal model curve 108 represents a modal model of flexural attenuation for 200 kHz frequency, and the modal model curve 110 represents a modal model of flexural attenuation for 125 kHz frequency (for comparison). A filtered measured flexural attenuation curve 122 represents reprocessed lab data acquired using a 125 kHz firing pulse with zero mud attenuation, and which has been filtered using a low pass filter of 125 kHz.

In contrast to the plot 100 of FIG. 4, the filtered measured flexural attenuation curve 122 does follow the same general trajectory as the modal model curves 106, 108, and 110. Even beyond 16 mm of thickness, the filtered measured flexural attenuation curve 122 tends to track the general shape of the model curves 106, 108, and 110 as the casing thickness increases. The reduced divergence between the filtered measured flexural attenuation curve 122 and the modal model curves 106, 108, and 110 is believed to be due to the reduction in extensional wave contamination by low-pass-filtering away the extensional wave energy at frequencies above 125 kHz.

The specific embodiments described above have been shown by way of example, and may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method comprising:
   emitting an acoustic signal at a casing in a well, wherein the acoustic signal excites the casing into generating an acoustic response signal containing Lamb waves, wherein the Lamb waves include flexural waves and extensional waves, and wherein the casing has a thickness of at least 16 mm;
   detecting the acoustic response signal from the casing in the well;
   filtering the detected acoustic response signal using a filter configured to exclude at least a portion of non-flexural-wave components of the acoustic response signal to reduce a relative contribution of the extensional waves in the acoustic response signal and thereby increase a relative contribution of the flexural waves in the acoustic response signal, wherein the filter comprises a length determined based on an expected mud attenuation of mud associated with the well, wherein the length is inversely proportional to the expected mud attenuation; and
   using the filtered acoustic response signal as a flexural-attenuation measurement.

2. The method of claim 1, wherein the emitted acoustic signal comprises an acoustic pulse having a frequency selected such that a product of the pulse frequency and the thickness of the casing is less than or equal to 3.2 Mhz·mm.

3. The method of claim 1, wherein the emitted acoustic signal comprises an acoustic pulse of a frequency less than 200 kHz.

4. The method of claim 1, wherein the detected acoustic response signal is filtered using an additional filter that attenuates frequencies higher than a center frequency of the flexural waves more strongly than frequencies lower than the center frequency of the flexural waves.

5. The method of claim 1, wherein the detected acoustic response signal is filtered using a low pass filter that filters out a portion of the detected acoustic response signal, wherein a product between a frequency of the acoustic response signal and the thickness of the casing is higher than 3.2 Mhz·mm.

6. The method of claim 1, wherein the detected acoustic response signal is filtered using a low pass filter that filters out frequencies higher than 200 kHz.

7. The method of claim 1, wherein the detected acoustic response signal is filtered using a low pass filter with 20 or fewer nonzero coefficients when the expected mud attenuation of the mud associated with the well is less than 16 dB/cm/MHz.

8. The method of claim 1, wherein the detected acoustic response signal is filtered using a low pass filter with 20 or more nonzero coefficients when the expected mud attenuation of the mud associated with the well is greater than 16 dB/cm/MHz.

9. The method of claim 1, wherein the thickness of the casing is at least 20 mm.

10. A system comprising:
    an acoustic downhole tool configured to be positioned in a cased well and obtain an acoustic measurement of Lamb waves produced by the casing when excited by an acoustic pulse of less than 200 kHz, wherein the Lamb waves comprise flexural modes and extensional modes; and
    a data processing system configured to filter the acoustic measurement to exclude at least a portion of non-flexural-mode components of the acoustic measurement to reduce a relative contribution of the extensional modes in the acoustic measurement and thereby increase a relative contribution of the flexural modes in the acoustic measurement, wherein the filter comprises a length determined based on an expected mud attenuation of mud associated with the well, wherein the length is inversely proportional to the expected mud attenuation.

11. The system of claim 10, wherein the acoustic downhole tool is configured to obtain the acoustic measurement of the Lamb waves excited by the casing via the acoustic pulse, wherein the acoustic pulse has a frequency selected such that a product of the pulse frequency and a thickness of the casing is less than or equal to 3.2 Mhz·mm.

12. An article of manufacture comprising one or more tangible, nontransitory, machine-readable media comprising instructions to:
    receive an acoustic measurement obtained by a downhole acoustic tool, wherein the acoustic measurement comprises Lamb waves produced by an acoustically excited casing having a thickness of 16 mm or greater, wherein the Lamb waves comprise flexural waves and extensional waves; and
    filter the acoustic measurement using a filter configured to at least partially remove frequencies of 200 kHz or greater, wherein the filter is configured to exclude at least a portion of non-flexural-wave components of the acoustic measurement to reduce a relative contribution of the extensional waves in the acoustic measurement and thereby increase a relative contribution of the flexural waves in the acoustic measurement, wherein the filter comprises a length determined based on an expected mud attenuation of mud associated with a cased well, wherein the length is inversely proportional to the expected mud attenuation.

13. The article of manufacture of claim 12, wherein the instructions to filter the acoustic measurement using the filter comprise instructions to use a low pass filter configured to at least partially remove a portion of the acoustic measurement, wherein a product between the frequency and the casing thickness is greater than 2.5 MHz mm.

14. The article of manufacture of claim 12, wherein the instructions to filter the acoustic measurement using the filter comprise instructions to:
    use a first filter when the expected mud attenuation within the casing is less than or equal to a threshold value; and
    use a second filter different from the first filter when the expected mud attenuation within the casing is greater than the threshold value.

15. The article of manufacture of claim 14, wherein the second filter filters more aggressively than the first filter.

16. The article of manufacture of claim 12, wherein the instructions to filter the acoustic measurement using the filter comprise instructions to use a low pass filter with 20 or fewer nonzero coefficients when the expected mud attenuation of the mud associated with the cased well is less than 16 dB/cm/MHz.

17. The article of manufacture of claim 12, wherein the instructions to filter the acoustic measurement using the filter comprise instructions to use a low pass filter with 20 or more nonzero coefficients when the expected mud attenuation of the mud associated with the cased well is greater than or equal to 16 dB/cm/MHz.

18. The system of claim 10, wherein the data processing system is configured to filter the acoustic measurement using the filter by:
   using a first filter when the expected mud attenuation is less than or equal to a threshold value; and
   using a second filter different from the first filter when the expected mud attenuation is greater than the threshold value.

19. The system of claim 18, wherein the second filter filters more aggressively than the first filter.

20. The system of claim 10, wherein the data processing system is configured to filter the acoustic measurement using a low pass filter that filters out frequencies higher than 200 kHz.

\* \* \* \* \*